United States Patent
Orr et al.

(10) Patent No.: US 6,326,626 B1
(45) Date of Patent: Dec. 4, 2001

(54) RELATING TO ION DETECTION

(75) Inventors: Christopher Henry Orr; Craig Janson Luff; Thomas Dockray, all of Calderbridge (GB); Duncan Whittemore Macarthur, Los Alamos, NM (US)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/307,365

(22) Filed: May 7, 1999

(30) Foreign Application Priority Data

May 8, 1998 (GB) ................................................ 9809744

(51) Int. Cl.[7] .................................................... G01T 1/18
(52) U.S. Cl. ................................ 250/385.1; 250/370.01; 250/374
(58) Field of Search ....................... 250/385.1, 370.01, 250/374, 376

(56) References Cited

U.S. PATENT DOCUMENTS

| | | | |
|---|---|---|---|
| 4,788,430 | * 11/1988 | Gonthier | 250/376 |
| 4,814,608 | 3/1989 | Dempsey et al. | 250/253 |
| 4,853,536 | 8/1989 | Dempsey et al. | 250/253 |
| 4,970,391 | * 11/1990 | Uber, III | 250/374 |
| 4,992,658 | 2/1991 | Ramsey et al. | 250/253 |
| 5,008,540 | 4/1991 | Dempsey | 250/336.1 |
| 5,055,674 | 10/1991 | Kotrappa | 250/255 |
| 5,059,803 | 10/1991 | Kronenberg | 250/385.1 |
| 5,107,108 | 4/1992 | Ramsey et al. | 250/253 |
| 5,126,567 | 6/1992 | Dempsey et al. | 250/336.1 |
| 5,128,540 | 7/1992 | Stieff | 250/255 |
| 5,184,019 | 2/1993 | MacArthur et al. | 250/380 |
| 5,187,370 | 2/1993 | MacArthur et al. | 250/379 |
| 5,194,737 | 3/1993 | MacArthur et al. | 250/382 |
| 5,281,824 | 1/1994 | MacArthur et al. | 250/380 |
| 5,311,025 | 5/1994 | MacArthur et al. | 250/374 |
| 5,514,872 | 5/1996 | Bolton et al. | 250/380 |
| 5,525,804 | 6/1996 | MacArthur et al. | 250/374 |
| 5,550,381 | 8/1996 | Bolton et al. | 250/380 |
| 5,663,567 | 9/1997 | Steadman et al. | 250/382 |
| 5,679,958 | 10/1997 | MacArthur | 250/382 |
| 5,877,502 | 3/1999 | Koster et al. | 250/382 |

FOREIGN PATENT DOCUMENTS

| | | | |
|---|---|---|---|
| 2 202 369 A | 9/1988 | (GB) | 47/2 |
| WO 98/38531 | 9/1998 | (WO) . | |

\* cited by examiner

*Primary Examiner*—Constantine Hannaher
*Assistant Examiner*—Otilia Gabor
(74) *Attorney, Agent, or Firm*—Workman, Nydegger & Seeley

(57) ABSTRACT

The apparatus and method provide a technique for improving detection of alpha and/or beta emitting sources on items or in locations using indirect means. The emission forms generate ions in a medium surrounding the item or location and the medium is then moved to a detecting location where the ions are discharged to give a measure of the emission levels. To increase the level of ions generated and render the system particularly applicable for narrow pipes and other forms of conduits, the medium pressure is increased above atmospheric pressure.

12 Claims, 1 Drawing Sheet

RELATING TO ION DETECTION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 Contract No. W-7405-ENG-36 awarded by the U.S. Department of Energy.

BACKGROUND OF THE INVENTION

1. Field of the Invention

This invention concerns, improvements in and relating to alpha and/or beta particle detection in small spaces, particularly but not exclusively through the detection of Ions produced by the passage of alpha and/or beta particles through a medium such as air.

2. Present State of the Art

Direct detection of alpha particles emitted into air is only possible if the detector is presented very close to the source. Alpha particles decay over a range of 4 to 5 cm and as a consequence are not directly detectable beyond that range.

Techniques have been developed in which the ions generated by the passage of the alpha particles over this range are detected at a remote location so as to give an indication of the level of contamination present. These techniques rely upon as much of the ions generated as possible being detected as the number of ions, and hence signal currents involved, are very small.

In many applications, the effective path of the alpha particles from the source is shortened by a collision between the alpha particle and an opposing surface. Such occasions occur in narrow diameter pipes, for instance, as well as in confined locations on the surfaces of pieces of apparatus, such as heat exchange surfaces on motors and the like, as well as elsewhere. The effective path of the alpha particles in such situations is so short that very few ions are actually generated before the alpha particle loses its energy through collision with further surfaces. Existing techniques for detecting these ions face problems in such circumstances due to the small number of ions generated.

Due to their high energies the length of the path over which beta particles decay in media such as air is far longer. As a consequence even in relatively large sized pipes and the like relatively few ions are generated through unit of path length and the effective path is shortened by a collision between the beta particle and opposing surface. As a consequence of the low number of ions generated beta particle monitoring using ions detection has not been pursued.

BRIEF SUMMARY AND OBJECTS OF THE INVENTION

The present invention aims to provide a method and apparatus whereby the number of ions generated is substantially increased for shorter path lengths. As a consequence of the increased number of ions generated, successful detection in more confined and smaller spaces can be implemented.

According to a first aspect of the invention we provide a system for monitoring alpha and/or beta emitting sources on an item or location, the item or location being in contact with a medium, alpha and/or beta emissions generating ions in the medium, the system comprising an instrument having a detecting chamber, the detecting chamber being provided with one or more electrodes for discharging and/or collecting ions, the instrument further being provided with means to monitor ions discharged on the electrode(s), the system being provided with means for moving the medium from in proximity to with the item or location to the detecting chamber, the system being provided with means for increasing the pressure of the fluid above atmospheric pressure.

The item(s) to be monitored may be or include tools, pipes, pumps, filters, cables, beams, rods and the like. The locations may include surfaces in general, such as floors, walls, ceilings, soil, rubble, material on a conveyor, and include parts of, or surfaces of items, such as glove boxes, tanks, vessels and the like.

Preferably the item is mounted or supported so as to maximise the surface area exposed, for instance to the airflow.

The item or location may be introduced within the detecting chamber.

The item or location may be monitored in-situ. The item or location may be connected to the detecting chamber by fluid conveying means, such as a pipe or conduit. The conveying means may be temporarily connected to the item or location. The conveying means may be provided as a part of the instrument. The conveying means, item or location and detecting chamber may define a closed circuit.

The medium may be a fluid such as a liquid, but is preferably a gas. The gas may be a mixture, such as air, or may be in substantially single gas form, such as argon.

The detecting chamber may comprise an elongate chamber. The detecting chamber may have a circular or rectilinear cross-section. The detecting chamber may be provided with an inlet and an outlet, the electrodes being provided between the inlet and the outlet. The inlet and/or outlet may connect to the surrounding environment for the instrument, for instance to give an open circuit instrument. The inlet and/or outlet may connect the instrument to the item or location, for instance through intermediate medium conveying means, for instance to give a closed circuit.

Preferably means are provided within the system to remove extraneous ions and/or particulate matter. The ions and/or particles may be removed by a filter. The filter may be provided downstream of the electrodes. The filter may, for instance be provided at the end of the fluid conveying means leading to the item or location. A filter is preferably provided in this way in a sealed system. The filter may be provided between the inlet from the surrounding environment and the detecting chamber. The filter may be provided between the detecting chamber and the outlet to the surrounding environment.

The detecting chamber may be openable to introduce or remove an item or location, for instance for an open circuit. The detecting chamber may comprise a sealable chamber, for instance for a closed circuit. The seal may be broken to make the chamber accessible to introduce and/or remove an item to be monitored.

Preferably the item or location is positioned upstream in the fluid flow relative to the electrodes, where fluid flow is used to move the ions.

The instrument may be provided with a single electrode. The instrument may be provided with a charged element or plate, such as an electret.

Preferably the apparatus comprises a plurality of electrodes, the electrodes being spaced from one another. The electrodes may be configured with a first outer electrode and a second outer electrode and none or one or more intermediate electrodes provided there between.

The electrodes are preferably arranged parallel to the direction of airflow. Preferably the airflow passes through the spacing between the electrodes.

One or more, and preferably all, of the electrodes may be planar. Preferably the electrodes are provided parallel to one another. Preferably the electrodes are provided in opposition, for instance, an outer electrode being opposed by one electrode, an intermediate electrode being opposed by two electrodes. The spacing between the electrodes is preferably the same between each pair of opposing electrodes. The spacing between the outer electrodes and the detector chamber is preferably the same as between opposing electrodes.

The electrodes may be continuous, such as a plate, or discontinuous, such as a grid.

An applied, preferably externally generated, potential may be employed. The electrical potential is preferably provided by an external power source. An electrostatic potential may be employed, for instance from a charged plate or element, such as from an electret.

Potentials of between 10V and 1000V may be provided.

The means for monitoring ions discharged on the electrode(s) may comprise electrostatic charge monitoring means. More preferably the means for monitoring ions discharged on the electrode(s) comprise current indicating means and more preferably current measuring means. Preferably a single current measuring means is used. Preferably the combined current of all the electrodes connected to the current measuring means is measured. An electrometer, such as a ground referenced electrometer or floating electrometer may be used for this purpose.

The means for moving the fluid may be a fan. Preferably the electrodes are provided between the fluid moving means and the item or location. The fan may be of controllable, and preferably of variable, speed.

One or more discrete flow paths over a surface or surfaces of the item or a location may be provided. A pipe, for instance, may have an external flow path separated from an internal flow path by the material forming the pipe. Preferably means are provided for regulating the medium flow along one or more of the discrete paths. Detection of alpha sources on or in one more of the discrete paths alone may be provided by obscuring or inhibiting one or more of the other flow paths. Sealing means may be provided to inhibit flow along one or more of the flow paths, most preferably in a selective manner. Inflatable seals and/or iris seals and/or aperture seals may be provided.

The medium pressurising means may comprise a medium pump for introducing the medium. The medium may be pumped in from the instruments environment, for instance surrounding air. The medium may be pumped in from a reservoir. The medium may be returned to the reservoir after use. The medium may be introduced from a pre-pressurised source, such as a gas cylinder. The medium may be filtered during introduction to remove extraneous ions and/or particulate matter.

According to a second aspect of the invention we provide a method for monitoring alpha and/or beta emitting sources on an item or location, the method comprising contacting the item or location with a medium, alpha and/or beta emissions generating ions in the medium, moving the medium to a detecting chamber provided in an instrument, the detecting chamber being provided with one or more electrodes for discharging and/or collecting ions, the method further comprising monitoring ions discharged on the electrode(s), the method including increasing the pressure of the medium above atmospheric pressure.

The second aspect of the invention includes the features, options and possibilities set out elsewhere in this application, including the steps necessary to implement them.

BRIEF DESCRIPTION OF THE DRAWINGS

Various embodiments of the invention will now be described, by way of example only, and with reference to the accompanying drawings, in which.

DETAILED DESCRIPTION OF THE PREFERRED EMBODIMENT

Items used in radioactive environments can potentially become contaminated with alpha and/or beta and/or gamma emitting sources. To monitor and potentially classify the level and type of contamination of an object it is therefore desirable to have as much information as possible about the type and level of contamination present.

It is known that detection of alpha particles emitted into air from an alpha emission source on an item can be achieved indirectly, but that direct detection is not practicable in many circumstances. This is because alpha particles are only able to travel a few centimetres in air. It is not, therefore, usually possible to position an alpha detector close enough to a source to directly detect the alpha particles within their 4–5 cm range.

However, as during the course of their travel through the air the alpha particles cause ionisation of a significant number of air molecules and as these ionised molecules remain in that state for a sufficient period of time to be swept from in proximity with the item surface to detector plates before they re-combine indirect alpha particle detection, through direct detection of the ions is possible.

Within the detector an electrical field is generated between alternating plates of the array of plates and the charged particles, the ionised air molecules, entering this field are attracted to the plates having an opposing applied potential. The current resulting from these ions is detected by an electrometer.

The current arising can be equated to a given level of contamination using pre-obtained calibration data A value for the overall contamination is thus obtained.

Alpha particles of 4–5 MeV energy lose this energy by creating approximately $1.5 \times 10^5$ ions over a 4 to 5 cm track in air at atmospheric pressure. This limits the efficiency of measurements indirectly in pipework and the like of narrow bone.

In the present invention because the air within the system is pressurised, the number of collisions of air molecules with alpha particles is significantly increased in a given path length because there are more air molecules present per unit volume of air. This in turn increases the number of ion pairs created by the alpha particles in any given path length. Investigations have established that the benefits in terms of the number level of ions generated out weigh the effect on the rate of recombination of ions as they travel from their point of generation to their point of detection and to outweigh the variation in detection efficiency This is particularly so if saturation point for ions in the system is not reached and if the high pressure system is provided with higher applied potentials and/or smaller electrode separations and/or longer electrode lengths, relative to the presentation direction of the ions, overall high pressure systems allow alpha particle detection to take place within smaller diameter pipes, fuel pins and other reduced dimension locations.

Figure 1:
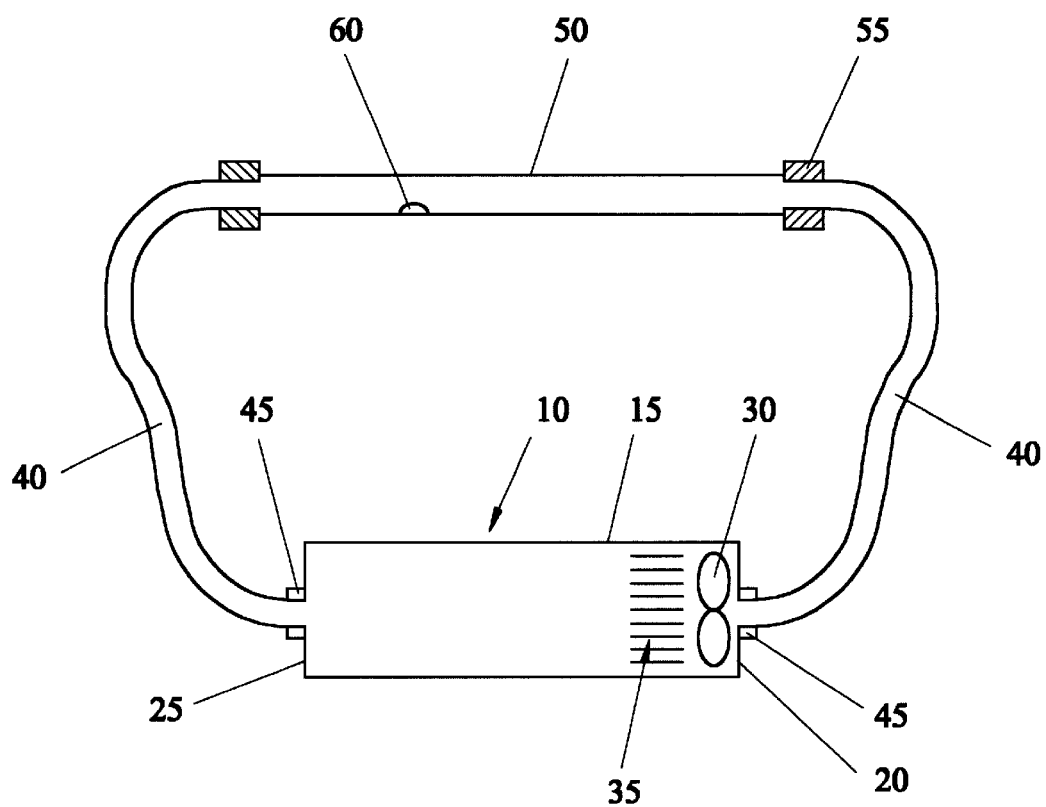
FIG. 1 illustrates an instrument according to a first embodiment of the invention.

Referring to FIG. 1 an instrument according to the present invention is designated generally by the reference numeral 10. The instrument 10 comprises a chamber 15 comprising an inlet end 25 and an outlet end 20. Air is drawn through the chamber 15 by means of a fan unit 30 from the inlet end 25 to the outlet end 20. The chamber 15 further comprises detector plates 35 adapted to detect the ions in the air flow.

The instrument also comprises two further lengths of tubing 40, sealed to respective ends 20, 25 of the chamber 15 by means of connectors 45. Each length of the tubing 40 is also sealingly connected to a length of pipe 50 by means of connectors 55.

To detect the level of alpha particles emitted into the air from the pipe 50, air at a pressure of greater than atmosphere is introduced into the closed circuit.

The fan 30 causes the pressurised air to circulate around the system thus sweeping the ionised molecules away from the alpha emission source 60 to the detector plates 35 where they give rise to a current. The current is indicative of the number of ions present and hence indicative of the level of alpha contamination.

As a closed system this type of technique is also amenable to the use of other gases than air. By using argon, for instance, at the same pressure 1.5 times as many ions are generated by the passage of an alpha particle. This gives rise to a higher overall level of ions and to a stronger signal as a result.

The most suitable pressure for operating a system can be determined readily as the alpha particle travel range is a function of the reciprocal of the pressure. The minimum pressure possible, to reduce operating difficulties, whilst achieving a reasonable extent of ion generation should be employed.

Figure 2:
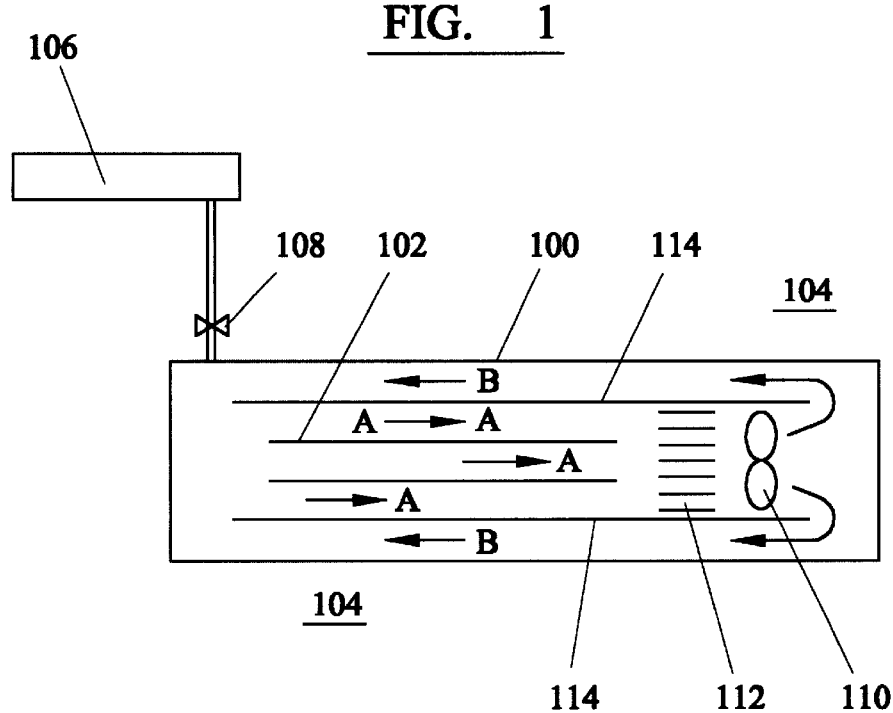
FIG. 2 illustrates an instruments according to a second embodiment of the invention.

As well as facilitating investigations of narrow aperture items, such as narrow pipes, the technique is also applicable to other situations. The apparatus illustrated in FIG. 2 consists of an enclosure 100 into which an item 102 can be introduced. Once positioned the enclosure 100 is fully sealed with respect to its surroundings 104. In its sealed state the enclosure 100 can be pressurised using gas cylinder 106 and control valve 108.

Ions are generated in the previously discussed manner by the passage of alpha particles. An airflow A is induced in the enclosure 100 by a fan 110 so as to promote movement of the ions to the detecting location 112. The return flow B is controlled by baffles 114. The ions are detected as a current at the detecting location 112.

After analysis the enclosure 100 is returned to ambient pressure, the excess pressure being contained in a sealed reservoir, for instance return to the cylinder 106. The item 102 can the be removed and the process repeated. The technique has the advantage that filtration of the inlet air/gas and outlet air/gas is avoided.

The pressures achievable in such a system also mean that alpha contamination present in channels on the surface of an item or in other complex or convoluted locations of small dimension can contribute to the ions measured. The pressure ensure that travel of the alpha particles even within these small distances gives ionisation rather than dissipation of the alpha particles energy through collision with an opposing surface for the channel.

As well as indirect monitoring of alpha emissions the technique can be applied to monitoring beta emissions. The increased pressure, and hence increased collisions and medium ionisation give rise to detectable ion numbers for beta too. The decay path is effectively shortened.

The system may also be provided with means for monitoring beta and/or gamma emission sources in conjunction with the item or location.

What is claimed is:

1. A system for monitoring alpha and/or beta emitting sources on an item or location, the item or location being in contact with a medium, alpha and/or beta emissions generating ions in the medium, the system comprising an instrument having a detecting chamber, the detecting chamber being provided with one or more electrodes for discharging and/or collecting ions, the instrument further being provided with means to monitor ions discharged on the electrode(s), the system being provided with means for moving the medium from in proximity with the item or location to the detecting chamber, the system being provided with means for increasing the pressure of the medium above atmospheric pressure within the detecting chamber.

2. A system according to claim 1 in which the pressure of the medium is increased to at least 1.5 times atmospheric pressure.

3. An instrument according to claim 1 in which the medium pressurising means comprise a medium pump for introducing the medium to the system.

4. An instrument according to claim 1 in which the medium is introduced from a pre-pressurised source, such as a gas cylinder.

5. A system according to claim 1 in which the item or location is monitored in-situ, the item or location being connected to the detecting chamber by fluid conveying means.

6. A system according to claim 1 In which the means for monitoring ions discharged on the electrode(s) comprise electrostatic charge monitoring means.

7. A system according to claim 1 in which the means for monitoring ions discharged on the electrode(s) comprise current measuring means.

8. A system according to claim 1 in which the means for moving the fluid is a fan.

9. A method for monitoring alpha and/or beta emitting sources on an item or location, the method comprising contacting the item or location with a medium, alpha and/or beta emissions generating ions in the medium, moving the medium to a detecting chamber provided in an instrument, the detecting chamber being provided with one or more electrodes for discharging and/or collecting ions, the method further comprising monitoring ions discharged on the electrode(s), the method including increasing the pressure of the medium above atmospheric pressure within the detecting chamber.

10. A method according to claim 9 in which the item or location is monitored in-situ.

11. A method according to claim 9 in which an item is monitored, the item being a pipe or a fuel pin.

12. A system for monitoring alpha and/or beta emitting sources on an item or location, the item or location being in contact with a medium, alpha and/or beta emissions generating ions in the medium, the system comprising:

a detecting chamber provided with one or more electrodes configured for at least discharging or collecting ions;

a monitor configured to detect ions discharged on the electrode(s);

means for moving the medium from in proximity with the item or location to the detecting chamber; and means for increasing the pressure of the medium above atmospheric pressure within the detecting chamber.

* * * * *

UNITED STATES PATENT AND TRADEMARK OFFICE
CERTIFICATE OF CORRECTION

PATENT NO. : 6,326,626 B1  Page 1 of 1
DATED : December 4, 2001
INVENTOR(S) : Christopher Henry Orr et al.

It is certified that error appears in the above-identified patent and that said Letters Patent is hereby corrected as shown below:

Title page,
Item [73], Assignee, after "(GB)" insert -- ; Regents of the University of California, Oakland, CA (US) --

Column 4,
Line 13, before "according" change "instruments" to -- instrument --
Line 47, after "data" insert a period
Line 50, change "1.5x105" to -- $1.5 \times 10^5$ --
Line 64, after "efficiency" insert a period Column 5,
Line 55, after "can" change "the" to -- then --

Signed and Sealed this

Fourteenth Day of September, 2004

JON W. DUDAS
*Director of the United States Patent and Trademark Office*